(12) United States Patent
Tremel et al.

(10) Patent No.: US 8,312,299 B2
(45) Date of Patent: Nov. 13, 2012

(54) METHOD AND APPARATUS FOR DYNAMIC POWER MANAGEMENT CONTROL USING SERIAL BUS MANAGEMENT PROTOCOLS

(75) Inventors: Christopher J. Tremel, West Fargo, ND (US); Brian M. Morlock, West Fargo, ND (US); Michael J. Schmitz, Fargo, ND (US)

(73) Assignee: Packet Digital, Fargo, ND (US)

( * ) Notice: Subject to any disclaimer, the term of this patent is extended or adjusted under 35 U.S.C. 154(b) by 724 days.

(21) Appl. No.: 12/411,932

(22) Filed: Mar. 26, 2009

(65) Prior Publication Data

US 2009/0249089 A1   Oct. 1, 2009

Related U.S. Application Data

(60) Provisional application No. 61/072,268, filed on Mar. 28, 2008.

(51) Int. Cl.
*G06F 1/00* (2006.01)
*G06F 1/26* (2006.01)
*G06F 1/32* (2006.01)

(52) U.S. Cl. ........ 713/300; 713/320; 713/322; 713/323; 713/324

(58) Field of Classification Search ............... 713/300, 713/320, 322, 323, 324
See application file for complete search history.

(56) References Cited

U.S. PATENT DOCUMENTS

| | | | |
|---|---|---|---|
| 5,206,944 A * | 4/1993 | Pilkenton | 711/5 |
| 5,606,242 A | 2/1997 | Hull et al. | |
| 5,633,573 A | 5/1997 | van Phuoc et al. | |
| 5,737,616 A * | 4/1998 | Watanabe | 713/340 |
| 5,745,375 A | 4/1998 | Reinhardt et al. | |
| 5,774,701 A | 6/1998 | Matsui et al. | |
| 5,848,277 A * | 12/1998 | Javernick et al. | 710/260 |
| 6,073,244 A | 6/2000 | Iwazaki | |
| 6,175,929 B1 * | 1/2001 | Hsu et al. | 713/500 |
| 6,311,263 B1 * | 10/2001 | Barlow et al. | 712/36 |

(Continued)

FOREIGN PATENT DOCUMENTS

EP   1475812 A2 * 11/2004

(Continued)

OTHER PUBLICATIONS

Bowman et al., "Dynamic variation monitor for measuring the impact of voltage droops on microprocessor clock frequency," Custom Integrated Circuits Conference (CICC), 2010 IEEE, pp. 1-4, Sep. 19-22, 2010.*

(Continued)

*Primary Examiner* — Faisal M Zaman
(74) *Attorney, Agent, or Firm* — Lowenstein Sandler PC (57) ABSTRACT

An apparatus for on-demand power management includes an I/O serial communication master device, peripheral devices that communicate with the master device along the serial bus, and a power manager that buffers the peripheral devices from the serial communication master. The power manager also manages voltage regulation and clock sources to the peripheral devices, with the ability of placing the peripheral devices in an inactive state, or in any number of active states as a means to conserve energy. In some embodiments, the I/O serial communications master acts as if the peripheral devices are always in the highest activity state, and the power manager manages the communications to and from the peripheral devices and the power management of the peripheral devices to minimize energy consumption and reduce system latency.

1 Claim, 8 Drawing Sheets

U.S. PATENT DOCUMENTS

| | | | |
|---|---|---|---|
| 6,333,650 | B1 | 12/2001 | Amin et al. |
| 6,348,780 | B1 | 2/2002 | Grant |
| 6,484,041 | B1 | 11/2002 | Aho et al. |
| 6,515,530 | B1 | 2/2003 | Boerstler et al. |
| 6,548,991 | B1 | 4/2003 | Maksimovic et al. |
| 6,574,739 | B1 | 6/2003 | Kung et al. |
| 6,608,528 | B2 | 8/2003 | Tam et al. |
| 6,754,837 | B1 | 6/2004 | Helms |
| 6,762,629 | B2 | 7/2004 | Tam et al. |
| 6,778,418 | B2 | 8/2004 | Meguro |
| 6,788,156 | B2 | 9/2004 | Tam et al. |
| 6,795,517 | B1 | 9/2004 | Marshall |
| 6,806,755 | B1 | 10/2004 | Simonds |
| 6,928,559 | B1 | 8/2005 | Beard |
| 6,948,098 | B2* | 9/2005 | Pillay et al. .................. 714/34 |
| 6,973,151 | B2 | 12/2005 | Lysdal et al. |
| 7,013,406 | B2 | 3/2006 | Naveh et al. |
| 7,093,177 | B2 | 8/2006 | West et al. |
| 7,096,373 | B2 | 8/2006 | Oh |
| 7,111,179 | B1 | 9/2006 | Girson et al. |
| 7,155,617 | B2* | 12/2006 | Gary et al. .................. 713/300 |
| 7,228,446 | B2 | 6/2007 | Jorgenson et al. |
| 7,278,035 | B2 | 10/2007 | Chung et al. |
| 7,337,335 | B2 | 2/2008 | Jorgenson et al. |
| 7,376,854 | B2 | 5/2008 | Lehwalder et al. |
| 7,392,411 | B2 | 6/2008 | Shakkarwar |
| 7,398,407 | B2 | 7/2008 | Jorgenson et al. |
| 7,657,764 | B2 | 2/2010 | Jorgenson et al. |
| 2002/0032875 | A1* | 3/2002 | Kashani ..................... 713/300 |
| 2002/0110212 | A1 | 8/2002 | Lysdal et al. |
| 2002/0124198 | A1* | 9/2002 | Bormann et al. ............ 713/323 |
| 2003/0065960 | A1 | 4/2003 | Rusu et al. |
| 2003/0071657 | A1 | 4/2003 | Soerensen et al. |
| 2003/0076183 | A1 | 4/2003 | Tam et al. |
| 2003/0188205 | A1* | 10/2003 | Mylly ........................ 713/300 |
| 2003/0221135 | A1* | 11/2003 | Motoe et al. ............... 713/300 |
| 2003/0223301 | A1* | 12/2003 | Trivedi et al. ............... 365/226 |
| 2004/0225902 | A1 | 11/2004 | Cesare et al. |
| 2005/0076253 | A1 | 4/2005 | Lu |
| 2005/0138444 | A1 | 6/2005 | Gaskins |
| 2006/0236007 | A1* | 10/2006 | Matulik ...................... 710/107 |
| 2007/0198867 | A1* | 8/2007 | Jorgenson et al. .......... 713/300 |
| 2007/0300047 | A1* | 12/2007 | Alfano et al. ................ 712/38 |
| 2008/0133943 | A1 | 6/2008 | Jorgenson et al. |
| 2008/0168285 | A1 | 7/2008 | de Cesare et al. |
| 2008/0263377 | A1 | 10/2008 | Jorgenson et al. |
| 2008/0263382 | A1 | 10/2008 | Jorgenson et al. |
| 2008/0307134 | A1 | 12/2008 | Geissler et al. |
| 2009/0063715 | A1 | 3/2009 | de Cesare et al. |
| 2009/0063877 | A1 | 3/2009 | Lewis et al. |
| 2009/0132837 | A1* | 5/2009 | Kumar ........................ 713/320 |

FOREIGN PATENT DOCUMENTS

| | | | |
|---|---|---|---|
| EP | 1544717 A2 | | 6/2005 |
| JP | 61211885 A | * | 9/1986 |
| JP | 01092818 A | * | 4/1989 |
| JP | 10337002 A | * | 12/1998 |
| JP | 2006244117 A | * | 9/2006 |
| JP | 2007193431 A | * | 8/2007 |
| JP | 2009075911 A | * | 4/2009 |
| WO | WO02/17052 A2 | | 2/2002 |

OTHER PUBLICATIONS

Yang et al., "Temperature-aware dynamic frequency and voltage scaling for reliability and yield enhancement," Design Automation Conference, 2009, ASP-DAC 2009. Asia and South Pacific, pp. 49-54, Jan. 19-22, 2009.*

Kim et al., "Dynamic voltage scaling algorithm for dynamic-priority hard real-time systems using slack time analysis," Design, Automation and Test in Europe Conference and Exhibition, 2002. Proceedings, pp. 788-794, 2002.*

Choudhary et al., "Hardware based frequency/voltage control of voltage frequency island systems," Hardware/Software Codesign and System Synthesis, 2006. CODES+ISSS '06. Proceedings of the 4th International Conference, pp. 34-39, Oct. 22-25, 2006.*

Hartman, Mark, et al. "On-Chip Power Management Utilizing an Embedded Hardware Controller and a Low-Power Serial Interface", National Semiconductor Corp. 1820 Lefthand Circle, Longmont, CO, 80501, USA, 10 pages, 2004.

U.S. Appl. No. 12/126,216, Office Action dated Jul. 27, 2010, 25 pages.

International Search Report and Written Opinion of the International Searching Authority, PCT/US09/38521 filed Mar. 27, 2009, mailed May 13, 2009.

* cited by examiner

METHOD AND APPARATUS FOR DYNAMIC POWER MANAGEMENT CONTROL USING SERIAL BUS MANAGEMENT PROTOCOLS

RELATED APPLICATIONS

This application claims the benefit of the filing date of U.S. Provisional Application No. 61/072,268, filed Mar. 28, 2008.

TECHNICAL FIELD

The present invention relates generally to power management and in particular to managing voltages and frequencies supplied to peripheral devices in response to processing demands, using bus management methods as a means to assess processing demand and control dynamic voltage and frequency scaling.

BACKGROUND

As digital electronic processing systems trend toward higher operating frequencies and smaller device geometries, power management has become increasingly important to prevent thermal overload while maintaining system performance and prolonging battery life in portable systems.

The two principal sources of power dissipation in digital logic circuits are static power dissipation and dynamic power dissipation. Static power dissipation is dependent on temperature, device technology and processing variables and is composed primarily of leakage currents. Dynamic power dissipation is the predominant loss factor in digital circuitry and is proportional to the operating clock frequency, the square of the operating voltage and the capacitive load. Capacitive load is highly dependent on device technology and processing variables, so most approaches to dynamic power management focus on frequency and voltage control.

Digital design architectures are characterized as having a master or controller interoperating with a number of devices on a shared bus. One conventional approach is to have all peripheral devices connected on a communication bus to be powered from a common power distribution system. The power management algorithms will enable or disable devices along this power distribution system as needed, in order to conserve energy from devices when they are not required for system operation. The means to enable and disable devices is controlled by software, typically by the input/output (I/O) controller of the serial bus.

BRIEF DESCRIPTION OF THE DRAWINGS

The present invention is illustrated by way of example, and not of limitation, in the figures of the accompanying drawings in which.

DETAILED DESCRIPTION

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. It should be noted that the "line" or "lines" discussed herein, that connect elements, may be single lines or multiple lines. It will also be understood by one having ordinary skill in the art that lines and/or other coupling elements may be identified by the nature of the signals they carry (e.g., a "clock line" may implicitly carry a "clock signal") and that input and output ports may be identified by the nature of the signals they receive or transmit (e.g., "clock input" may implicitly receive a "clock signal").

Various embodiments of on-demand power management are described, specifically improving upon a system using serial communication structures between components. The embodiments described herein are directed at minimizing the total energy consumption of the peripheral devices. The embodiments described herein relate to a power management scheme that manages voltages and frequencies of the peripheral devices in response to processing demands, using bus management methods as a means to assess processing demand and control dynamic voltage and frequency scaling.

In one embodiment, an apparatus for on-demand power management includes an I/O serial communication master device, peripheral devices that communicate with the master along a serial bus, and a power manager that buffers the peripheral devices from the serial communication master. The power manager also manages voltage regulation and clock sources to the peripheral devices, with the ability of placing the peripheral devices in an inactive state, or in any number of active states as a means to conserve energy. In some embodiments, the I/O serial communication master device acts as if the peripheral devices are always in the highest activity state, and the power manager manages the communications to and from the peripheral devices and the power management of the peripheral devices to minimize energy consumption and reduce system latency.

In one embodiment, a power manager is disposed between an I/O controller (e.g., I/O controller of a host processing device) and a peripheral device. The power manager adjusts the operating voltage and/or clock frequency of the peripheral device to minimize energy consumption, depending on the operating state of operation of the peripheral device. The power manager determines the operating state of the peripheral device by monitoring and buffering the bus transactions between the I/O controller and the peripheral device to determine the current processing demand. If a particular bus transaction requires that the peripheral device be in a different operating state (also referred to as power state), the power manager can delay the bus transactions sent from the I/O controller until the power manager has finished adjusting the operating voltage and/or clock frequency required for the new operating state. For example, the power manager can hold the clock line low for the serial bus (e.g., an inter-IC (I2C or I$^2$C) bus) to pause the bus transaction being sent from the I/O controller. In addition, a bus multiplexer could be combined with the power manager such that multiple peripheral devices using different types of buses could be managed by one power manager with an interface to one I/O controller via one bus.

The bus multiplexer power manager can translate between different protocols and bus communication schemes.

In one embodiment, the method includes monitoring a serial bus to assess a processing demand for a peripheral device in a processing system. The serial bus is sometimes referred to as a serial communication channel. The processing demand is correlated to energy demand, which is appropriately addressed with dynamic voltage scaling and dynamic frequency scaling. The dynamic frequency scaling also includes generating a second set of one or more clock frequencies in response to the processing demand, and switching to the second set of clock frequencies from a first set of one or more clock frequencies. In one embodiment, the second set of one or more clock frequencies are phase-locked to the reference frequency and phase-matched to the first set of one or more clock frequencies. The method also includes switching from the first set of clock frequencies to the second set of clock frequencies without halting the processing system. In one embodiment, the method further includes generating a first set of one or more operating voltages in response to the processing demand, and switching from a first set of one or more operating voltages to the second set of one or more operating voltages without halting the processing system.

Figure 1:
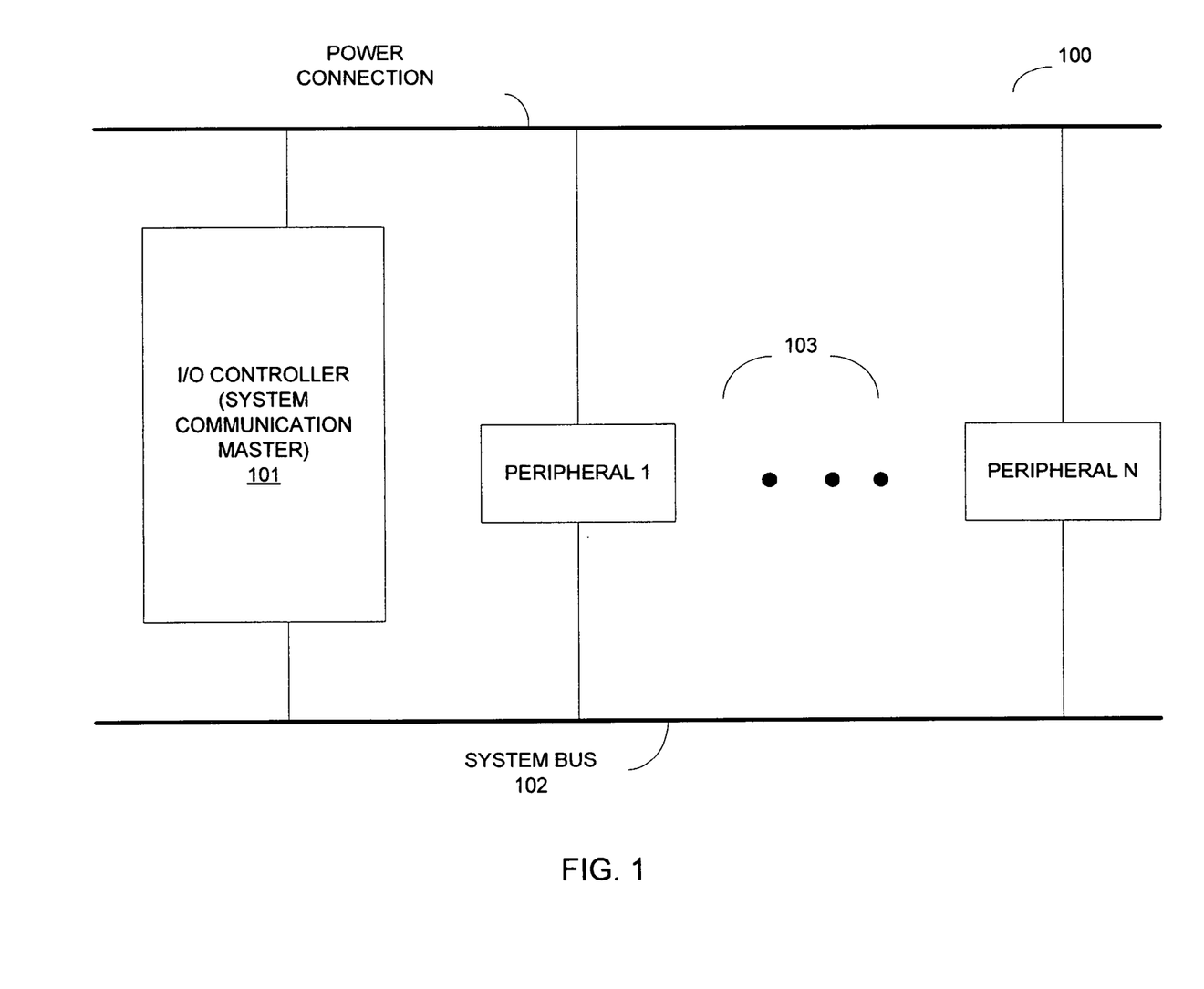
FIG. 1 illustrates one embodiment of on-demand power management in a processing system.

FIG. 1 illustrates one embodiment of on-demand power management in a processing system 100. Processing system 100 includes an I/O controller 101. The I/O controller 100 may be part of a general-purpose processing device such as a microprocessor or central processing unit, or the like. Alternatively, I/O controller 101 may also be part of a special-purpose processing device such as an application specific integrated circuit (ASIC), a field programmable gate array (FPGA), a digital signal processor (DSP) or the like. The I/O controller 101 may also be any combination of a general-purpose processing device and a special-purpose processing device. Alternatively, the I/O controller 101 may be part of a chipset that extends the bus of a host processing device to the peripheral devices. In the following discussion, I/O controller 101 acts as an I/O serial communication master device in the processing system 100, such as, for example, an I2C master. In one embodiment, the I/O controller 101 is coupled to a host processing device (not illustrated), such as one or more microprocessors, or central processing units (CPUs), or the like.

The I/O controller 101 is coupled to a system bus 102 which carries system data and commands to and from the I/O controller 101. The system bus 102 is a serial bus. The system bus 102 is coupled to peripheral devices 103, which provide input and output functions to the processing system 100. A peripheral device is a device attached to a host processing device (e.g., host computer), and whose primary functionality is dependent upon the host, and can therefore be considered as expanding the host's capabilities, while not forming part of the host's core architecture. The peripheral devices 103 may be on-chip integrated peripheral devices, such an Ethernet device, a memory device, a USB device, audio devices, or the like. The peripheral device may also be other types of I/O devices, for example, displays, keyboards, wireless communication channel devices, wired communication channel devices, user input devices, printers, scanners, disk drives, tape drives, microphones, speakers, cameras, or the like.

Figure 2A:
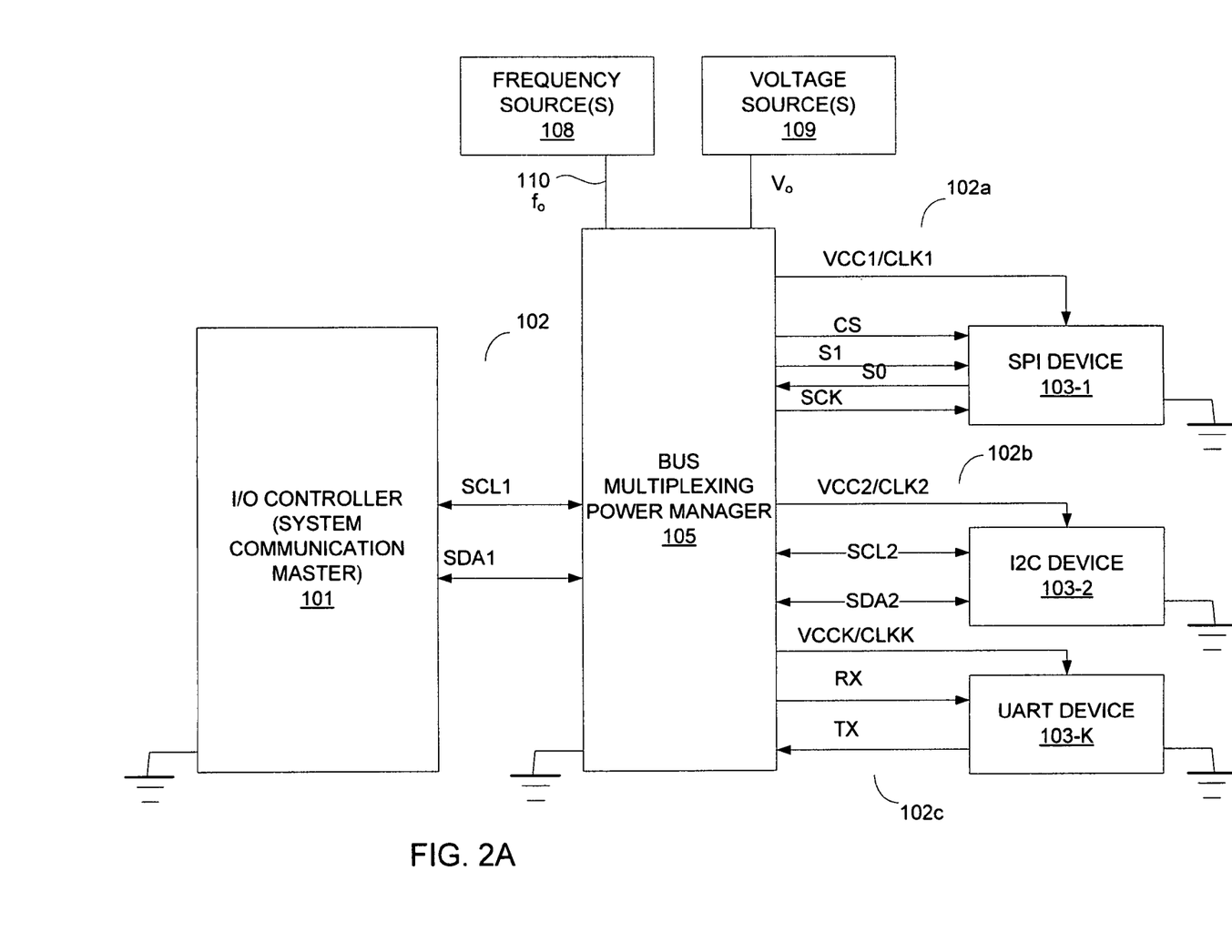
FIG. 2A illustrates one embodiment of on-demand power management design with an I/O controller and the same devices on a serial bus.

Processing system 100 also includes a power manager 105 (also referred to herein as bus multiplexing power manager), which may be coupled to system bus 102, a frequency source 108, and a voltage source 109, as illustrated in FIG. 2A. The power manager 105 is coupled to I/O controller 101 and peripheral devices 103-1 through 103-k via separate portions of the system bus (e.g., 102, 102a, 102b, and 102c), which may each include a clock bus and voltage bus to the respective peripheral device. The power manager 105 buffers the peripheral devices 103 from the serial communication master, the I/O controller 101. The power manager 105 manages voltage regulation and clock sources to the peripheral devices 103, with the ability of placing the peripheral devices 103 in an inactive state, or in any number of active states as a means to conserve energy. In some embodiments, the I/O controller 101 acts as if the peripheral devices 103 are always in the highest activity state, and the power manager 105 manages the communications to and from the peripheral devices 103 and the power management of the peripheral devices 103 to minimize energy consumption and reduce system latency.

In one embodiment, as illustrated in FIG. 2A, the power manager 105 is coupled to the external frequency source 108, and uses the reference frequency ($f_0$) from frequency source 108 to generate or derive one or more clock frequencies $f_1$ through $f_m$, phase-locked to the reference frequency ($f_0$), to provide clock signals to the I/O controller 101 and the peripheral devices 103-1 through 103-k. In another embodiment, the frequency source 108 may provide multiple clock frequencies to the power manager 105, and the power manager 105 can provide the appropriate clock frequency to one or more of the peripheral devices 103. In other embodiments, frequency source 108 may be integrated with the power manager 105 and reside with the power manager 105 on a common carrier substrate, such as, for example, an integrated circuit (IC) die substrate, a multi-chip module substrate, or the like.

In one embodiment, as illustrated in FIG. 2A, the power manager 105 is coupled to the voltage source 109, and uses a voltage $V_0$ from the voltage source 109 to generate or derive one or more operating voltages $V_1$ through $V_n$ to be provided to the I/O controller 101 and peripheral devices 103-1 through 103-k. In another embodiment, the voltage source 109 may provide multiple operating voltages to the power manager 105, and the power manager 105 can select the appropriate operating voltage to provide to one or more of the peripheral devices 103. In other embodiments, voltage source 109 may be integrated with the power manager 105 and reside with the power manager 105 on a common carrier substrate such as, for example, an IC die substrate, a multi-chip module substrate, or the like.

Each of the I/O controller 101 and the peripheral devices 103-1 through 103-k may have one or more voltage inputs and one or more clock inputs. In one embodiment, two or more of I/O controller 101, power manager 105, frequency source 108, and peripheral devices 103-1 through 103-k may reside on a common carrier substrate, for example, a printed circuit board (PCB) such as motherboard, a daughter board, or a line card. Alternatively, the common carrier substrate on which the two or more of the I/O controller 101, power manager 105, frequency source 108, voltage source 109, and peripheral devices 103-1 through 103-k may reside on IC die substrate.

With reference to FIG. 2A, peripheral devices 103-1 through 103-k may be any type of device, component, circuit, subsystem or system capable of communicating with I/O controller 101 via system bus (e.g., 102, and 102a, 102b, or 102c). For example, any of peripheral devices 103-1 through 103-k may be a single chip device such as a system on a chip, an ASIC, an FPGA, a memory chip or like device. Any of peripheral devices 103-1 through 103-k may also be a multi-chip module including any combination of single chip devices on a common integrated circuit substrate. Alternatively, peripheral devices 103-1 through 103-k may reside on one or more printed circuit boards, such as, for example, a mother board, a daughter board or other type of circuit card. The serial bus 102 between the I/O controller 101 and the power manager 105 may be any type of serial bus, such as, for example, a serial peripheral interface (SPI) bus, an I2C bus, a universal asynchronous receiver and transceiver (UART) bus, a System Management bus (SMB or SMBus), a one-wire bus, or the like.

In the depicted embodiment of FIG. 2A, the serial bus 102 is an I2C bus, and the peripheral device 103-1 is a SPI device, peripheral device 103-2 is an I2C device, and peripheral device 103-k is a UART device. The buses between the power manager 105 and the respective peripheral devices 103 are based on the type of the particular peripheral device. Alternatively, the serial bus 102 may be other types of serial buses, and the peripheral devices, and their corresponding buses may be other types than those depicted in FIG. 2A.

In one embodiment, the power manager 105 is capable of monitoring a bus transaction from the I/O controller 101 and determining whether the bus transaction is addressed to the SPI device, the I2C device, or the UART device. Details of one embodiment of a bus multiplexing flow between the I/O controller 101 (e.g., I2C master device) and the power manager 105, and the power manager 105 and these different types of peripheral devices 103-1 through 103-k in processing system 100 are described below with respect to FIGS. 3 and 4A-4C.

Figure 2B:
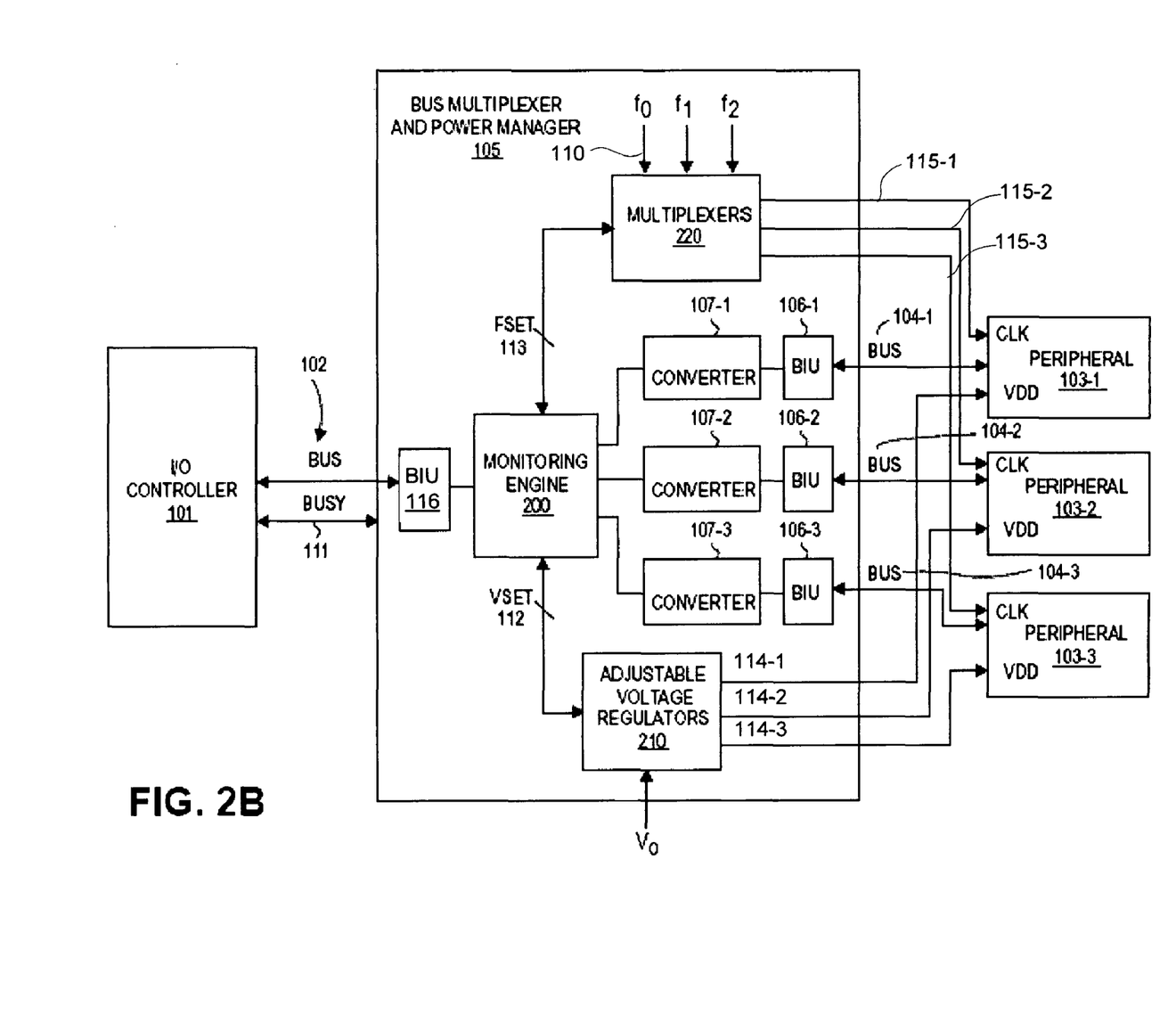
FIG. 2B illustrates one embodiment of the power manager of FIG. 2A.

FIG. 2B illustrates one embodiment of the power manager 105 of FIG. 2A. The power manager 105 is coupled to the I/O controller 101 by way of the bus 102, and is coupled to the peripheral devices 103-1 through 103-3 by way of bus lines 104-1 through 104-3, respectively. The power manager 105 includes a bus interface unit (BIU) 116 that is coupled to the bus 102 to communicate bus transactions to and from the I/O controller 101. Similarly, BIUs 106-1 through 106-3 are coupled to the bus lines 104-1 through 104-3, respectively, to communicate bus transactions to and from the peripheral device 103-1 through 103-3, respectively. The BIUs in the power manager 105 are the physical circuit interfaces that enable the internal bus signals of the power manager 105 to connect to the external buses (e.g., 102, 104-1 through 104-3).

In one embodiment, the power manager 105 can inform the I/O controller 101 that a particular peripheral device is busy by sending a busy signal 111 to pause the transmission of the bus transaction until the particular peripheral device is ready for the bus transaction. The busy signal 111 sent by the power manager 105 to the I/O controller can be part of, or separate from the serial bus 102 connecting the I/O controller 101 and the power manager 105. For example, the busy signal 111 may be embedded within the serial bus protocol, such as clock stretching when the serial bus 102 is an I2C bus, a SMBus, or the like.

The power manager 105 includes a monitoring engine 200 coupled to the BIU 116 to monitor bus transactions between the I/O controller 101 and the peripheral device 103. The monitoring engine 200 decodes the data (e.g., bus transaction) transmitted by the I/O controller 101 and determines which peripheral device to which the data from the I/O controller 101 should be transmitted. The monitoring engine 200 also determines the required operating state for the peripheral devices based on the data being transmitted by the I/O controller 101. The monitoring engine 200, using the determined operating states, adjusts the operating voltages and clock frequencies supplied to the peripheral devices to put the peripheral devices in the appropriate states for processing the data. For example, the monitoring engine 200 uses the determined operating state to adjust the operating voltages and clock frequencies supplied to the peripheral devices such that energy consumption is minimized.

In one embodiment, the monitoring engine 200 monitors the bus transactions to assess processing demand for the peripheral devices 103, and the monitoring engine 200 dynamically adjusts either or both operating voltage on the voltage lines 114-1 through 114-3 and the clock frequency for the peripheral device on the clock lines 115-1 through 115-3 based on the processing demands. Each of the processing demands correlate to the required operating state for the peripheral device to process the particular bus transaction or perform the peripheral device's functions.

In one embodiment, the monitoring engine 200 determines whether the peripheral devices 103-1 through 103-3 are to operate in a specified operating state for one or more bus transactions or for a specified time. In one embodiment, the monitoring engine 200 switches one or more of the peripheral devices 103 from a first operating state to a second operating state based on the determinations. In the depicted embodiment, the monitoring engine 200 switches to the second operating state by providing a signal 112 (Vset) to adjustable voltage regulators 210 to adjust the operating voltages of the peripheral devices 103. The adjustable voltage regulators 210 receives an operating voltage ($V_O$) from voltage source(s) 109, and provides the adjusted operating voltages to the peripheral devices 103-1 through 103-k by way of voltage lines 114-1 through 114-3, respectively. Alternatively, the adjustable voltage regulators 210 can receive multiple voltages from the voltage source(s) 109, and select the appropriate voltage to provide to the peripheral devices 103-1 through 103-k by way of voltage lines 114-1 through 114-3, respectively.

In the depicted embodiment, the monitoring engine 200 switches to the second operating state by providing a signal 113 (Fset) to multiplexer 220 to adjust the clock frequencies of the peripheral devices. The clock multiplexer 220 provides the adjusted clock frequencies to the peripheral devices 103-1 through 103-k by way of clock lines 115-1 through 115-3, respectively. In one embodiment, the multiplexer 220 receives the reference frequency ($f_0$) from frequency source 108, and one or more clock frequencies $f_1$ through $f_m$, which are derived from the reference frequency ($f_0$) by the power manager 105. The multiplexer 220 receives a command or a signal from the monitoring engine 200 to select which of available frequencies to provide as a clock signal to the peripheral devices 103. The one or more clock frequencies $f_1$ through $f_m$ are phase-locked to the reference frequency ($f_0$), and the one or more clock frequencies $f_1$ through $f_m$ may be phased-matched with one another, as described below. In another embodiment, the multiplexer 220 receives multiple clock frequencies from one or more frequency sources, which are either part of the power manager 105 or external to the power manager 105, such as the frequency source(s) 108. In another embodiment, the reference frequency ($f_0$) is provided to the power manager 105 from the I/O controller 101, and the power manager 105 generates the one or more clock frequencies $f_1$ through $f_m$. In another embodiment, the power manager 105 receives the reference frequency ($f_0$) from an external source, such as the frequency source 108, and provides the reference frequency ($f_0$) to the I/O controller 101, and the power manager 105 generates the one or more clock frequencies $f_1$ through $f_m$ and provides the one or more clock frequencies $f_1$ through $f_m$ to the peripherals 103 as directed by the monitoring engine 200. Although FIG. 2B depicts the clock signals being provided to the peripheral devices through clock lines 115, in another embodiment, the clock signals may be provided to the peripheral devices by way of the bus lines 104-1 through 104-3.

In the depicted embodiment, the monitoring engine 200 is coupled to the peripheral devices 103-1 through 103-3 by way of the BIUs 106-1 through 106-3, which are coupled to the bus lines 104-1 through 104-3, respectively. Since the peripheral devices 103 may be different types of devices and may communicate using different types of bus protocols, converters 107-1 through 107-3 can be coupled between the monitoring engine 200 and the BIUs 106-1 through 106-3, respectively, to translate between different protocols and bus communication schemes. The converters 107-1 through 107-3 converts the bus protocol used on the serial bus 102 that interfaces the I/O controller 101 to the power manager 105 to a different bus protocol that is used on the bus (e.g., 104-1, 104-2, or 104-3) that interfaces the power manager 105 to a peripheral device (e.g., 103-1, 103-2, or 103-3). In one embodiment, the converters 107-1 through 107-3 are Media Access Control (MAC) converters. For example, the converter 107-1 translate a first bus protocol, used by the I/O controller 101 (e.g., I2C protocol), to a second bus protocol, used by the peripheral device (e.g., SPI protocol since the peripheral device 103-1 is a SPI device). In another embodiment, the BIUs 106 and the converters 107 may be integrated together to handle both the bus protocol conversions (MAC conversions) and the physical (PHY) conversions. In some embodiments, the converters may not translate the bus protocol when the bus protocols are the same for the I/O controller 103 and the peripheral device 103. For example, the converter 107-2 does not need to translate the I2C bus protocol, used by the I/O controller 101, since the peripheral device 103-2 is an I2C device. Alternatively, other configurations of devices and bus protocols may be used, as would be appreciated by one of ordinary skill in the art having the benefit of this disclosure.

In one embodiment, the monitoring engine 200 receives a current bus transaction from the I/O controller 101 over the serial bus 102 and determines whether the destination peripheral device is to operate in a second operating state to process the current bus transaction. The monitoring engine 200 switches the destination peripheral device to operate in the second operating state to allow the peripheral device to process the current bus transaction. The second operating state corresponds to the current processing demand for the destination peripheral device. In this embodiment, the first operating state is a lower power state than the second operating state.

In one embodiment, the monitoring engine 200 determines which peripheral device is being accessed, whether the access is a write operation or a read operation, and determines the required operating voltages and clock frequencies for the peripheral devices based on the monitored bus activity. In another embodiment, the monitoring engine 200 determines the required operating voltage and clock frequency of the I/O controller 101 based on the monitored bus activity. In one embodiment, the monitoring engine 200 is a hardware state machine. In another embodiment, the monitoring engine 200 is a processing device, such as a microprocessor, with programmable software. Alternatively, the monitoring engine 200 may be implemented as software or firmware executed by a processing device.

Figure 3:
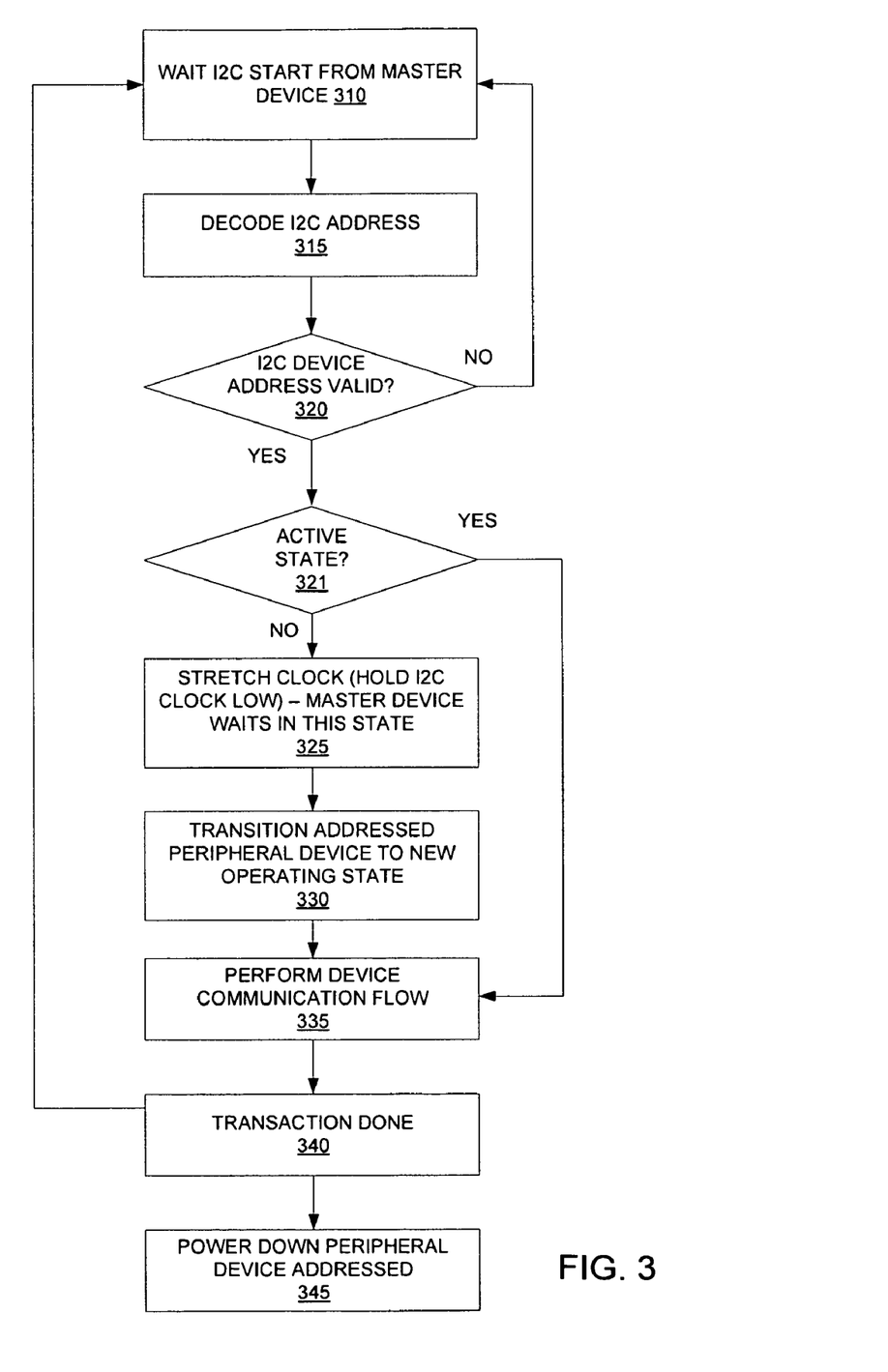
FIG. 3 illustrates one embodiment of a bus multiplexing flow.

FIG. 3 illustrates one embodiment of a bus multiplexing flow. The flow may be performed by processing logic of various components in processing system 100 described above, such as I/O controller 101 and power manager 105 in FIGS. 2A and 2B. Processing logic may include software, firmware, hardware, or any combination thereof. Referring to FIG. 3, processing logic waits for an I/O controller start signal of a bus transaction from a master device, such as the I/O controller 101 in FIGS. 1, 2A, and 2B (processing block 310). The processing system includes a serial bus, such as the system bus 102 in FIGS. 1, 2A and 2B. In the depicted embodiment, the I/O controller 101 is an I2C device. Processing logic decodes an I2C device address on the serial bus (processing block 315) for the bus transaction. Then processing logic checks if the I2C device address is valid (processing block 320). If the I2C device address is not valid, then processing logic returns to processing block 310. Otherwise, processing logic transitions to processing block 321.

At processing block 321, the processing logic determines if the addressed peripheral device is in an active state for processing the bus transaction. If the peripheral device is in an active state, the processing logic transitions to processing block 335. Otherwise, processing logic transitions to processing block 325 to switch the peripheral device to the active state.

At processing block 325, processing logic delays the bus transaction until the power manager has finished adjusting the operating voltage and/or clock frequency required for the new operating state. In one embodiment, the processing logic delays the bus transaction by stretching a clock signal while the master device waits in this state. In clock stretching, the power manager 105 may hold the clock line (SCL1) low after receiving (or sending) a bit, indicating that it is not yet ready to process more data. Clock stretching allows the power manager 105 to control the flow of incoming data.

In some embodiments, processing logic stretches the clock signal by holding the I2C clock low in the I2C bus to pause the I2C transaction from the I/O controller 101. In another embodiment, the processing logic delays the bus transaction by storing the data in a buffer and retransmitting it at a later time. In another embodiment, the power manager can inform the I/O controller 101 that the peripheral device is busy (busy signal 111 depicted in FIG. 2B), such that the I/O controller 101 pauses the transmission of the bus transaction until a later time. Then processing logic transitions the addressed peripheral device to the new operating state (processing block 330). In one embodiment, the processing logic transitions the addressed peripheral device by adjusting the voltage supply and clock frequency. In another embodiment, the processing logic transitions the addressed peripheral device by adjusting the voltage supply or the clock frequency. Processing logic initiates a device communication flow (processing block 335) after the transition is completed. Details of some embodiments of the device communication flow are discussed below with reference to FIGS. 4A-4C. Then the bus transaction is completed in processing block 340. Subsequently, processing logic may transition the peripheral device back to the previous state or some other lower power state from the new operating state (processing block 345) after the bus transaction is completed, and returns to processing block 310. Alternatively, processing logic may transition to the previous state or some other lower power state after a specified period of time.

Figure 4A:
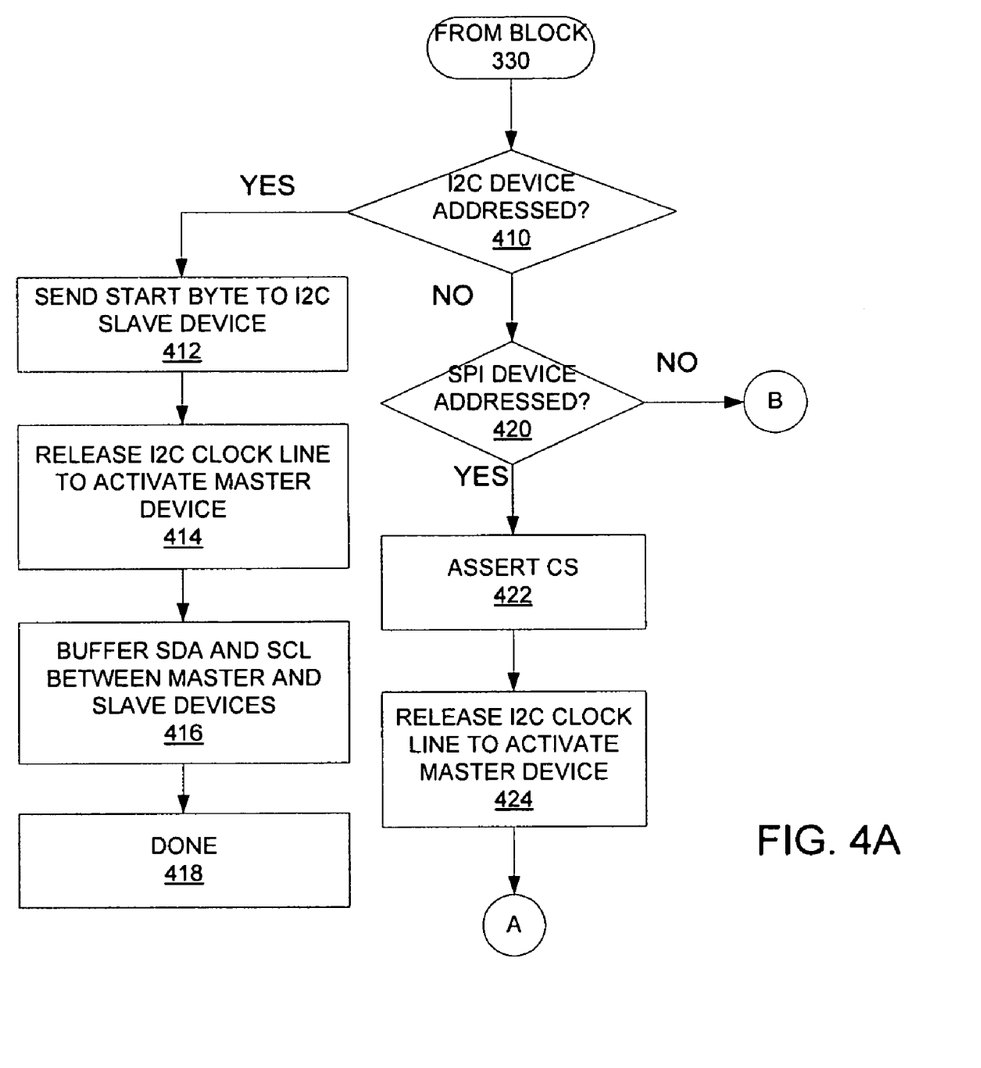
FIGS. 4A-4C illustrate one embodiment of a device communication flow.
Figure 4B:
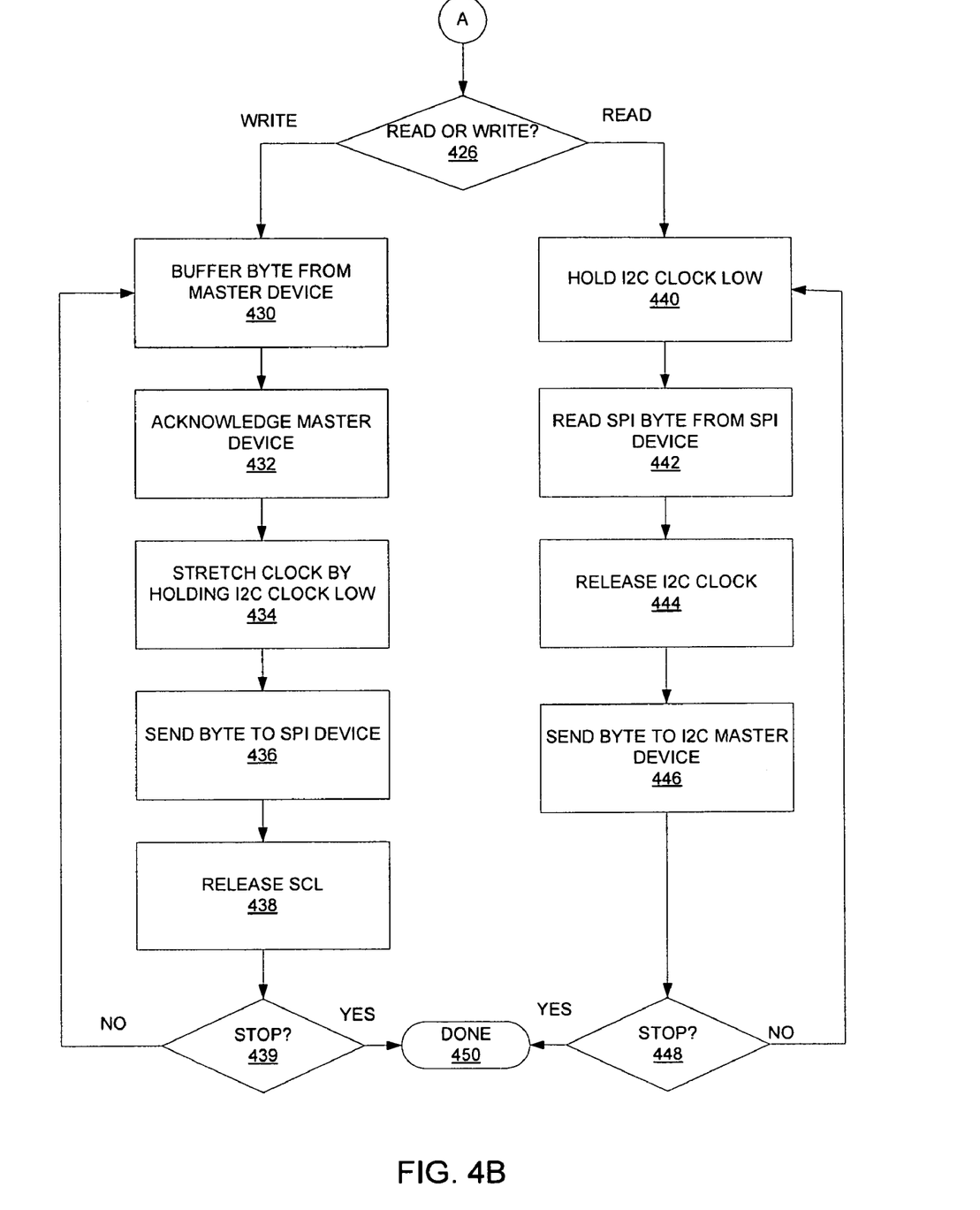
Figure 4C:
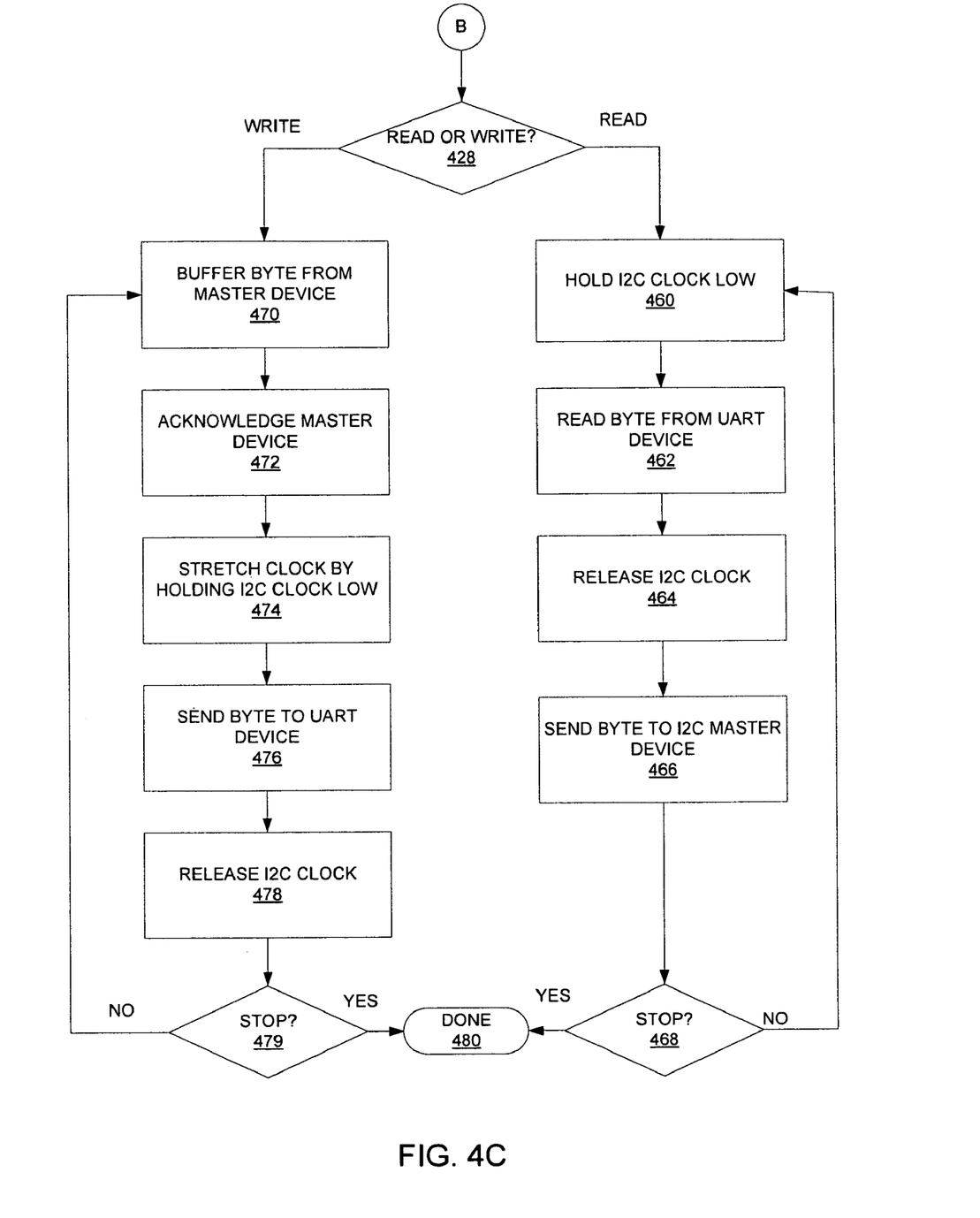

FIGS. 4A-4C illustrate one embodiment of a device communication flow. The flow may be performed by processing logic of various components in system 100 described above, such as I/O controller 101 and power manager 105 in FIGS. 2A and 2B. Processing logic may include software, firmware, hardware, or any combination thereof. Referring to FIG. 4A, processing logic determines if an I2C device is addressed (processing block 410). If so, processing logic sends the START byte of the current bus transaction to an I2C slave device (processing block 412). Processing logic then releases an I2C clock line to activate the master device (processing block 414) to continue with the bus transaction. Processing logic further buffers the clock line (SCL1) and the data line (SDA1) between the master device and the slave device (processing block 416), and the process ends at processing block 418. Otherwise, processing logic transitions to processing block 420.

At processing block 420, processing logic determines if a SPI device is addressed. If so, processing logic asserts a chip select (CS) signal for the SPI device (processing block 422). Then processing logic releases I2C clock line to activate the master device (processing block 424) to continue with the bus transaction. Next, referring to FIG. 4B, processing logic determines if a read or a write operation is to be performed (processing block 426).

If a write operation is to be performed, processing logic buffers some data from the master device (processing block 430). In one embodiment, the processing logic buffers a byte of data. In another embodiment, the processing logic buffers a few bits of data, instead of an entire byte, to allow the processing logic to start sending data as soon as possible. Although some of the embodiments refer to buffering, sending, writing, and reading bytes of data, in other embodiments, the processing logic may buffer any set of one or more bits of data as would be appreciated by one of ordinary skill in the art having the benefit of this disclosure. Processing logic acknowledges the master device (processing block 432). Processing logic stretches the clock by holding the I2C clock low (processing block 434). Then processing logic sends the byte to the SPI device (processing block 436). Subsequently, processing logic releases SCL1 (processing block 438). Then processing logic checks if the data transfer has been stopped (processing block 439). If not, processing logic returns to processing block 430. Otherwise, the process ends at processing block 450.

If a read operation is to be performed, processing logic holds the I2C clock low (processing block 440). Then processing logic reads a byte of data for the SPI device (processing block 442). Processing logic then releases the I2C clock (processing block 444). Processing logic sends the byte of data to I2C master device (processing block 446). Then processing logic checks if the data transfer has been stopped (processing block 448). If not, processing logic returns to processing block 440. Otherwise, the process ends at processing block 450.

Referring back to processing block 420 in FIG. 4A, if processing logic determines that the SPI device is not addressed, then the device addressed is an UART device. Thus, processing logic transitions to processing block 428 in FIG. 4C to determine if a write or a read operation is to be performed. Referring to FIG. 4C, if a write operation is to be performed, processing logic buffers a byte of data from the master device (processing block 470). Then processing logic acknowledges the master device (processing block 472). Then processing logic holds the I2C clock low (processing block 474). Processing logic further sends the byte of data to the UART device (processing block 476). Processing logic then releases the I2C clock (processing block 478). Then processing logic checks if the data transfer has been stopped (processing block 479). If not, processing logic returns to processing block 470. Otherwise, the process ends at processing block 480.

If a read operation is to be performed on the UART device, processing logic transitions from processing block 428 to processing block 460. Processing logic holds I2C clock low (processing block 460). Then processing logic reads a byte of data from the UART device (processing block 462). Next, processing logic releases the I2C clock (processing block 464). Processing logic sends the byte of data to the I2C master device (processing block 466). Then processing logic checks if the data transfer has been stopped (processing block 468). If not, processing logic returns to processing block 460. Otherwise, the process ends at processing block 480.

In another embodiment, the processing logic provides a first operating voltage and a first clock frequency to a peripheral device 103, operating at a first operating state. The processing logic monitors bus transactions on a serial bus (e.g., bus 102 and 104) between the I/O controller and the peripheral device to assess a current processing demand for the peripheral device 103, and dynamically adjust one of or both the first operating voltage and first clock frequency in response to the current processing demand. The processing logic can monitor the bus transactions by receiving a current bus transaction from the I/O controller 101, and determining whether the peripheral device 103 is to operate in a second lower-power operating state to process the current bus transaction. The processing logic switches the peripheral device 103 to operate in the second operating state to allow the peripheral device 103 to process the current bus transaction. The processing logic can delay the current bus transaction being sent to the peripheral device 103 until the processing logic has finished adjusting the operating voltage and/or the clock frequency. In one embodiment, the processing logic delays the current bus transaction by storing the current bus transaction in a buffer, and subsequently transmitting the current bus transaction to the peripheral device 103 when the processing logic has finished the adjusting. In another embodiment, the processing logic delays by notifying the I/O controller 101 that the peripheral device is busy, for example, by providing a busy signal (e.g., 111 in FIG. 2B) on the busy signal line. Alternatively, the processing logic may delay by stretching a clock signal between the I/O controller 101 and the power manager 105 to place the I/O controller 101 in a wait state for the current bus transaction.

Figure 5:
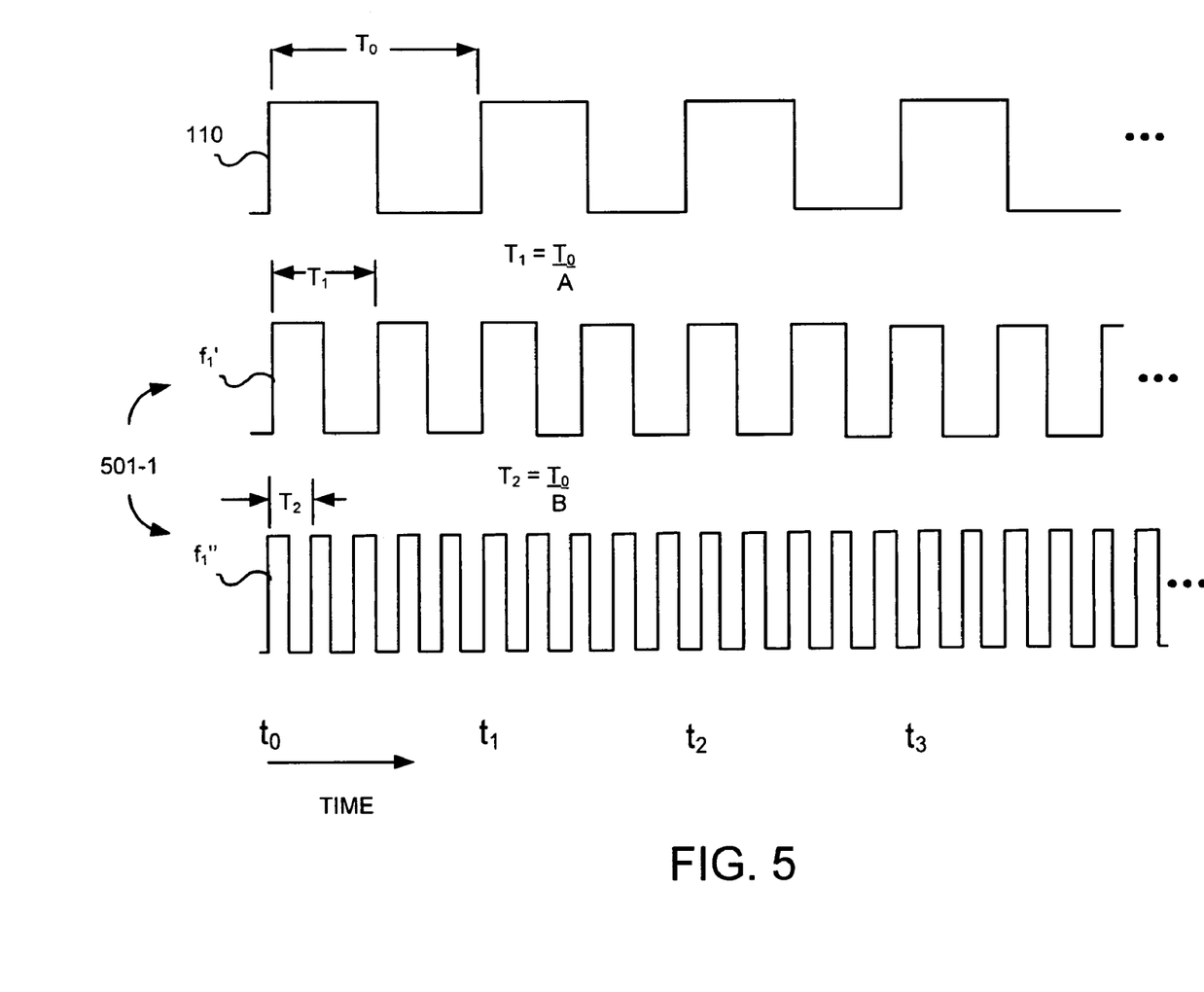
FIG. 5 illustrates one embodiment of phase-matching in on-demand power management.

It will be appreciated by one of ordinary skill in the art that in some embodiments the clock frequencies $f_1$-$f_m$ may be harmonically related because all are phase-locked to the common reference frequency 110 ($f_0$). In particular, any two clock frequencies in a single frequency control channel (e.g., clock frequencies $f_1'$ and $f_1''$ in frequency control channel 501-1) will be harmonically related. FIG. 5 illustrates how this harmonic relationship may be used to switch between a first clock frequency and a second clock frequency without halting the processing system 100. FIG. 5 depicts reference frequency 110 having frequency $f_0$ and period $T_0=1/f_0$, clock frequency $f_1'=Af_0$ and period $T_1=T_0/A$, and frequency $f_1''=Bf_0$ and period $T_2=T_0/B$. As shown in FIG. 5, the phase of clock frequency $f_1'$ will periodically align with the phase of clock frequency $f_1''$ (e.g., at times $t_1$, $t_2$, $t_3$, etc.) at time intervals corresponding to the lowest common multiples of $T_1$ and $T_2$. This time interval may be calculated, for example, by I/O controller 101 or the monitoring engine 220. Therefore, when a new operating state is commanded by the monitoring engine 200 in response to the processing demand, the switch from the first clock frequency (e.g., $f_1'$) to the second clock frequency (e.g., $f_1''$) may be timed to occur when the phases of the first clock frequency and the second clock frequency are aligned. If the phases of the first clock frequency and the second clock frequency are aligned when the frequencies are switched (e.g., by a multiplexer), there is no phase discontinuity in the processing system 100 and the frequencies may be switched without halting the processing system 100. In one embodiment, the ratio of the second clock frequency to the first clock frequency may be very large, approximately up to six orders of magnitude depending on the stability of the reference frequency 110. Alternatively, other ratios may be used.

Thus, a method and an apparatus for on-demand power management have been described. It will be apparent from the foregoing description that aspects of the present invention may be embodied, at least in part, in software. That is, the techniques may be carried out in a computer system or other data processing system in response to a processing device executing sequences of instructions contained in a memory. In various embodiments, hardwired circuitry may be used in combination with software instructions to implement the present invention. Thus, the techniques are not limited to any specific combination of hardware circuitry and software or to any particular source for the instructions executed by the data processing system. For example, in some embodiments, the techniques may be carried out using firmware (e.g., embedded software). Alternatively, the techniques may be carried out using any combination of hardware, firmware, and software. In addition, throughout this description, various functions and operations may be described as being performed by or caused by software code to simplify description. However, those skilled in the art will recognize what is meant by such expressions are that the functions result from execution of the code by a processor or controller.

A machine-readable medium can be used to store software and data which when executed by a data processing system causes the system to perform various methods of the present invention. This executable software and data may be stored in various places including, for example, read-only memory (ROM) and programmable memory or any other device that is capable of storing software programs and/or data.

Thus, a computer-readable medium includes any mechanism that stores information in a form accessible by a machine (e.g., a computer, network device, personal digital assistant, manufacturing tool, any device with a set of one or more processors, etc.). For example, a computer-readable medium includes recordable/non-recordable media (e.g., read only memory (ROM); random access memory (RAM); magnetic disk storage media; optical storage media; flash memory devices; etc.); etc. In one embodiment, the computer-readable medium stores instruction therein that, when executed by a processing device, cause the processing device to perform the operations described herein.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A computer-implemented method, comprising:

providing a first operating voltage and a first clock frequency to a peripheral device, operating in a first operating state, wherein the peripheral device is coupled to an input-output (I/O) controller in a processing system with a serial bus;

monitoring bus transactions on the serial bus using a power manager, coupled between the I/O controller and the peripheral device, to assess a current processing demand for the peripheral device; and dynamically adjusting at least one of the first operating voltage or the first clock frequency in response to the current processing demand, wherein a plurality of peripheral devices are coupled to the I/O controller using the power manager, including the peripheral device, and wherein the monitoring comprises:

receiving a start signal from the I/O controller for a current bus transaction;

decoding a device address of the current bus transaction to select one of the plurality of peripheral devices to send the current bus transaction;

delaying the current bus transaction from being sent to the selected peripheral device by placing the I/O controller in a wait state for the current bus transaction;

while delaying the current bus transaction, transitioning the selected peripheral device to a second operating state from the first operating state by said dynamically adjusting, wherein the first operating state is a lower power state than the second operating state;

initiating a device communication flow between the I/O controller and the peripheral device for the current bus transaction when the selected peripheral device is operating at the second operating state; and determining that the selected peripheral device is a serial peripheral interface (SPI) device, and wherein initiating the device communication flow comprises:

asserting a chip select (CS) signal to the SPI device;

releasing the clock line between the I/O controller and the power manager to activate the I/O controller from the wait state; and determining whether the current bus transaction is a read operation or a write operation, wherein if the current bus transaction is a read operation, the determining comprises:

holding the clock line between the I/O controller and the power manager low;

reading a first set of one or more bits of data from SPI device;

releasing the clock line between the I/O controller and the power manager; and sending the first set of data to the I/O controller, and wherein if the current bus transaction is a write operation, the determining comprises:

buffering a second set of one or more bits of data received from the I/O controller;

acknowledging the I/O controller;

holding the clock line between the I/O controller and the power manager low;

sending the second set of data received from the I/O controller to the SPI device; and releasing the clock line between the I/O controller and the power manager.

* * * * *